No. 854,342. PATENTED MAY 21, 1907.
B. ENRIGHT.
MANUFACTURE OF HYDRAULIC CEMENT.
APPLICATION FILED FEB. 25, 1907.
3 SHEETS—SHEET 1.
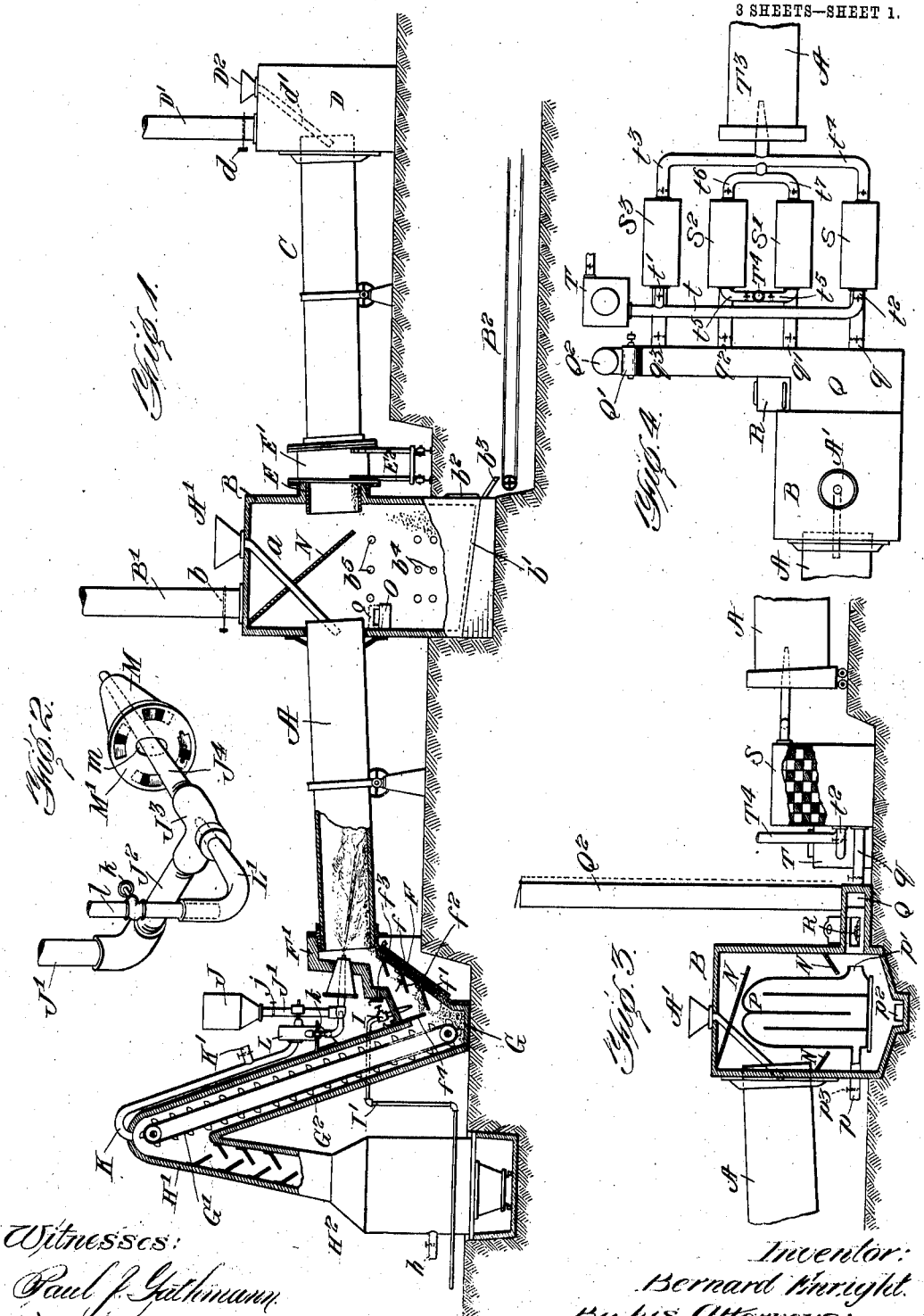
Witnesses:
Paul J. Gathmann
M. Lilian Adams
Inventor:
Bernard Enright
By his Attorneys
Baldwin Wight No. 854,342. PATENTED MAY 21, 1907.
B. ENRIGHT.
MANUFACTURE OF HYDRAULIC CEMENT.
APPLICATION FILED FEB. 25, 1907.
3 SHEETS—SHEET 2.
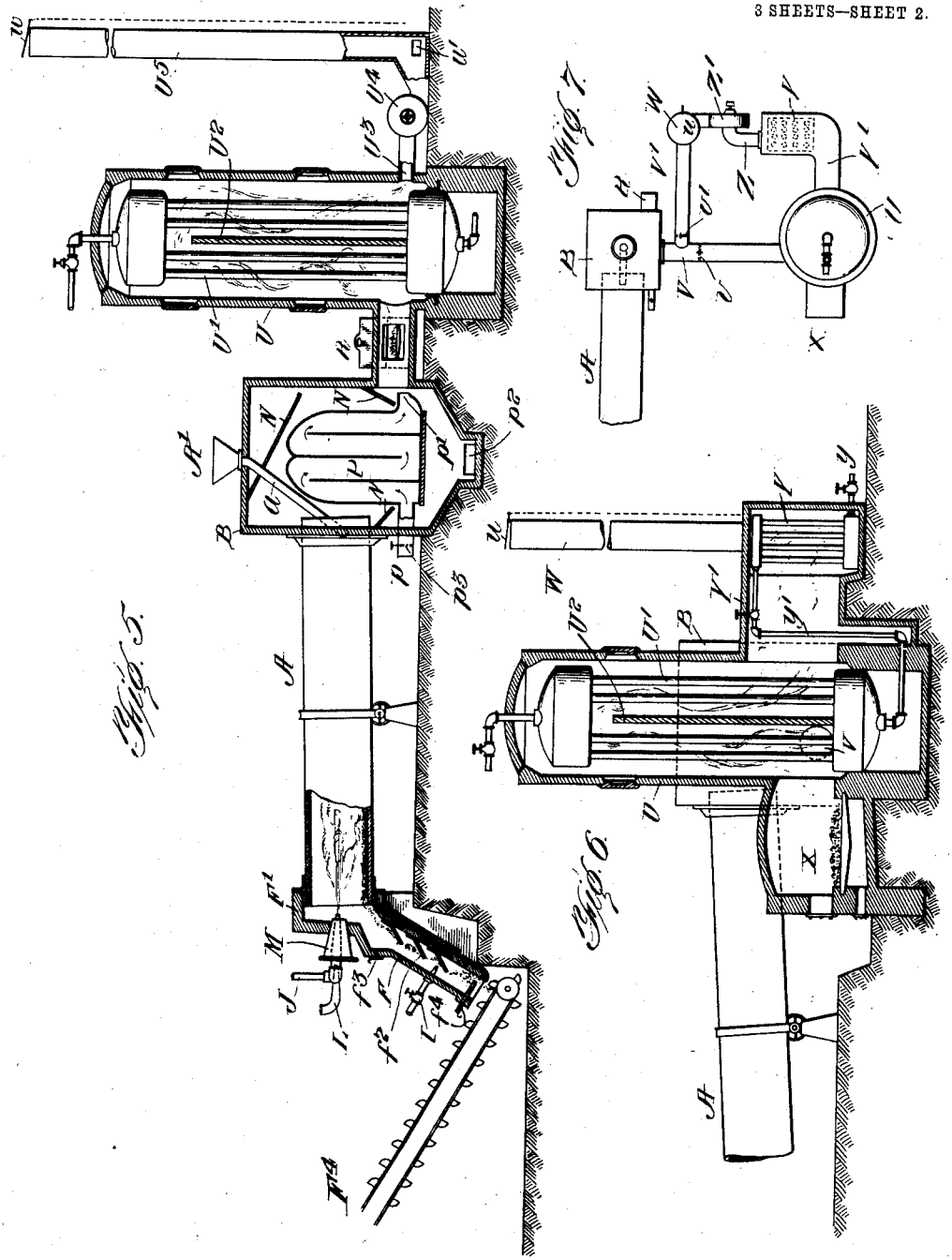
Witnesses:
Paul J. Gathmann
M. Lilian Adams.
Inventor:
Bernard Enright.
By his Attorneys:
Baldwin & Wight No. 854,342. PATENTED MAY 21, 1907.
B. ENRIGHT.
MANUFACTURE OF HYDRAULIC CEMENT.
APPLICATION FILED FEB. 25, 1907.
3 SHEETS—SHEET 3.
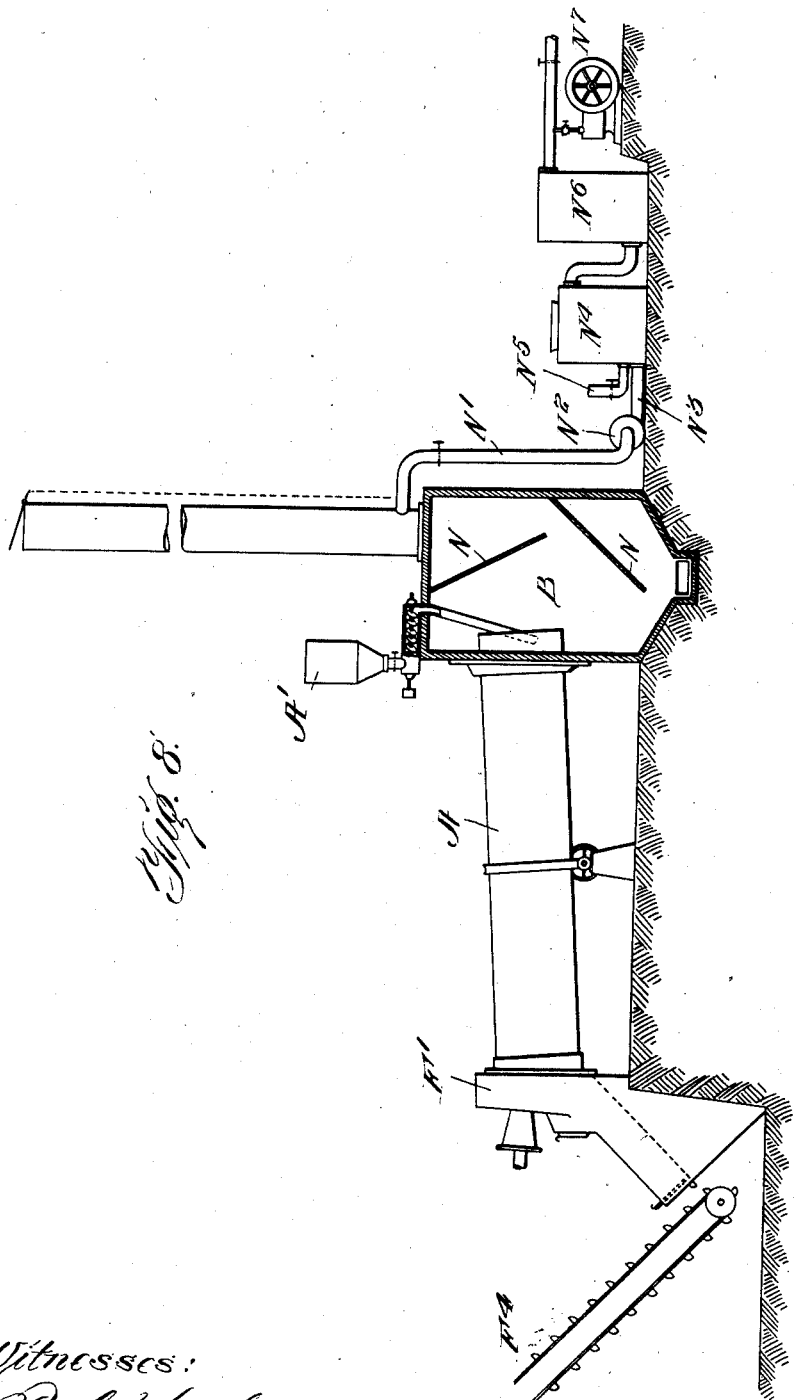

UNITED STATES PATENT OFFICE.

BERNARD ENRIGHT, OF SOUTH BETHLEHEM, PENNSYLVANIA.

MANUFACTURE OF HYDRAULIC CEMENT.

No. 854,342.   Specification of Letters Patent.   Patented May 21, 1907.

Application filed February 25, 1907. Serial No. 359,177.

*To all whom it may concern:*

Be it known that I, BERNARD ENRIGHT, a citizen of the United States of America, and a resident of South Bethlehem, county of Northampton, and State of Pennsylvania, temporarily residing in St. Louis, State of Missouri, have invented certain new and useful Improvements in the Manufacture of Hydraulic Cement, of which the following is a specification.

My invention relates particularly to the manufacture of hydraulic cement, and especially to such processes as involve the use of a rotary kiln in which cement rock or clay and lime or carbonate of lime is reduced to clinker by burning fuel therein injected into the kiln together with air. The rapid and intense combustion in such kilns results in large volumes of heated gases which were formerly allowed to go to waste, but which have latterly been used for various industrial purposes.

Letters Patent of the United States, No. 815,080 of March 13, 1906, and No. 834,374 of October 30, 1906, were granted to me for certain processes and apparatus for utilizing these gases, and my present invention involves new methods of operation whereby such gases may be used with great economy and for new purposes. My invention also involves certain new methods of forming the gases in the rotary kiln, and converting and handling them after they leave the kiln.

Usually in operating rotary clinker-forming kilns, the fuel and air are fed in such proportions as to effect complete combustion therein, and the products of combustion in the stack gases mainly consist of carbon dioxid which is incombustible. Various methods have been devised for converting this carbon dioxid into carbon monoxid and for using such combustible gas for various purposes.

According to my invention, I so regulate the admission of fuel and air to the rotary kiln as to produce gas largely consisting of carbon monoxid, with which air is subsequently combined and this mixture is burned to heat driers, boilers, etc. In this way, while the combustion in the rotary kiln is imperfectly performed, perfect combustion is subsequently obtained so that there is no loss of fuel in the operation.

It is common in this class of inventions to blow the fuel mixed with air into the kiln in such a manner as to cause it to burn in a flame substantially parallel with the axis of the kiln or in line therewith. It is also common to deflect such flame so as to cause it to impinge on the material in the bottom of the kiln. In the former case complete combustion has been aimed at and the heat imparted from radiation from the axial flame has been relied on to calcine and clinker the cement-forming material. When the flame has been caused to impinge on the cement-forming material, complete combustion has also been produced and a very intense localized heat has been obtained which often quickly burns out the lining of the kiln or otherwise injures it. I have found that by causing the flame to impinge on the material and using a deficiency of air, I can produce the necessary temperature to properly calcine or sinter the cement-forming material without too rapidly burning out the lining, while at the same time, producing stack gases rich in carbon monoxid which can subsequently be combined with air and burned for various purposes. Thus there is no loss of fuel and the process is economical. I have also discovered that I may employ an axial flame but so proportion the air and fuel as to cause incomplete combustion resulting largely in carbon monoxid. The fuel and air so fed can be regulated to produce a large amount or volume of heat sufficient to calcine or sinter the material while at the same time not unduly injuring the lining and producing large volumes of exceedingly hot incombustible gases.

When complete combustion takes place in the rotary kiln according to the old method, the reaction between the fuel and air (carbon and oxygen need only be considered) will be represented by the formula, $C + O_2 = CO_2$, in which 1 lb. of carbon would theoretically combine with about $2\frac{2}{3}$ lbs. of oxygen, or practically a little less than 12 lbs. of air. The complete combustion of 1 lb. of carbon would yield about 14,650 British thermal units. If, however, only one half of the required weight of air or 6 lbs. were supplied to unite with 1 lb. of carbon, the result would be shown by the reaction $C + O = CO$. This incomplete combustion of 1 lb. of carbon to CO yields only 4,485 British thermal units. Then if the required quantity of air should be supplied, viz., 6 lbs., complete combustion would be effected being represented by the reaction $CO + O = CO_2$, and the burning of the CO to $CO_2$ develops the remainder of the heat, viz., 10,165 British thermal units, (4,485 + 10,165 = 14,650) and thus the full number of heat units is obtained from the fuel just as would have been the case if complete combustion had taken place in the kiln in the first instance. This description of the reactions is given by way of illustration of the principles involved. A more suitable method of procedure in the manufacture of Portland cement would be to supply enough air to burn, say one half the fuel to $CO_2$, and the other half to CO. Such proportions would give in the products of combustion about equal parts by volume (10% to 11% of each gas. But inasmuch as the usual cement-forming material furnishes some carbon dioxid from its decomposition, the reaction actually taking place under such conditions would be more accurately represented by the following analysis of the stack gases:—carbon dioxid $CO_2$—19.5%, carbon monoxid CO—9.5%, nitrogen—71%. If the operation is carried on to produce these results, not only will something like 50% of the carbon gases from the fuel be combustible, but sufficient heat is developed in the kiln to reduce the cement-forming material to clinker in the desired way. Theoretically the heating power of the resulting gas would be approximately 35% of the fuel used for its formation. It will be understood, therefore, that while in other processes, as commonly practiced, care is taken to effect complete combustion, according to my invention incomplete combustion is aimed at. About 50% of the gases from combustion in the kiln (excluding nitrogen) being combustible, as well as highly heated, I can use the sensible heat of the gases issuing from the kiln and can also by adding oxygen, burn the carbon monoxid to obtain a higher temperature and to increase very largely this heat to heat driers, boilers and other apparatus.

While my improvements are especially designed for use in connection with a rotary clinker forming cement furnace, they may also be used in connection with other furnaces for burning or drying other materials.

In the accompanying drawings I have shown apparatus for practicing my improved methods of operation, but my improved methods may be practiced by other forms of apparatus, those shown being by way of illustration and as showing the best ways now known to me of carrying out my invention.

Figure 1 is a view partly in elevation and partly in section of one form of apparatus involving my invention. In this case my improvements are embodied in an apparatus for calcining or sintering cement rock or lime stone by a rotary kiln; the products of combustion from the kiln being employed to heat a rotary drier associated therewith. Fig. 2 is a detail view in perspective showing the adjustable means for injecting fuel and air. Fig. 3 illustrates how my improvements may be embodied in an apparatus wherein the carbon monoxid issuing from the rotary kiln may be combined with air and burned to heat stoves or regenerators employed in connection with another kiln. Fig. 4 is a plan view of the apparatus shown in Fig. 3. Fig. 5 shows another form of apparatus in which the gases from the rotary kiln are combined with air and used to heat a steam boiler. Fig. 6 illustrates another form of apparatus in which the gases are employed to heat a steam boiler and a feed water heater. Fig. 7 is a plan view of the apparatus shown in Fig. 6. Fig. 8 shows an apparatus in which the gases issuing from the kiln are passed through a gas producer to further enrich them and are then conveyed to a gas engine.

In Fig. 1, the rotary kiln, A, may be of any approved type. As shown it is a rotary clinker-forming cement kiln of well-known construction. The material to be calcined or clinkered is fed into the upper end of the kiln from the hopper, A', through the spout, $a$, and the products of combustion from the kiln pass into a chamber, B, (which I call a mixing chamber) provided at the top with a stack, B', having a damper, $b$. The bottom of the chamber is preferably inclined at $b'$ and provided with a door, $b^2$, and a spout, $b^3$, adapted to deliver to a carrier, $B^2$. Air ports, $b^4$, are provided in the lower portion of the chamber, B, and other air ports, $b^5$, at a higher elevation are also provided therein.

C indicates a rotary drier of well known construction which is adapted to deliver the dried material into the chamber, B, in the manner indicated. This drier is suitably mounted to rotate in the usual way and its upper or outer end extends into a stack chamber or hood, D, at the top of which is a stack, D', provided with a damper, $d$. The material to be dried is fed from the hopper, $D^2$, and through the spout, $d'$, to the drier.

E indicates a cylindrical section permanently attached to the walls of the chamber, B, and E' indicates a movable cylindrical section which, when in the position shown in Fig. 1, serves to join the inner end of the drier with the section E and thus establishes an unbroken communication between the drier and the chamber. The movable section, E', is shown as being mounted on a truck or carriage, $E^2$, by means of which it may be removed and when this is done the opening thereby left in the chamber, B, may be closed by securing a suitable plate to the outer end of the section, E. These devices are of well known construction and need not be further described.

Air and fuel are injected into the opposite end of the kiln, A, in the manner presently described. The clinker formed in the kiln passes down through a chute, F, formed within a casing produced by enlarging the hood, F', at the fuel feed end of the kiln. The bottom, $f$, of the chute may be made of metal lined with fire-brick and it is perforated, as shown, and provided with a perforated sliding plate, $f'$, which acts as a valve to open and close the perforations in the bottom, $f$, of the chute; and also to regulate the size of the openings therein. Baffle plates, $f^2$, project into the hood from the bottom, $f$, and as the clinker falls from the kiln it drops from plate to plate and the air entering through the perforations in the bottom, $f$, acts to cool, to some extent, the clinker while itself being heated, and this heated air passes into the kiln and helps to support combustion therein. Other valved openings, $f^3$, may be provided, and a gate $f^4$, may be employed to hold the clinker in the chute until the latter is full, then the gate may be opened or partially opened to allow the clinker to pass through the chute, the rate of delivery being about equal to the rate of supply. In this way sufficient clinker is maintained in the chute to heat the incoming air to quite a high temperature. After dropping from the baffle plates the clinker falls into the clinker pit, G, and is taken up by a bucket conveyer, G', operating in a suitable housing, G², and delivered to the stack, H', of a clinker cooler, H², of well known construction. Air is admitted to the clinker cooler at $h$ and passes upwardly therein meeting the clinker as it falls, serving to cool it and itself becoming heated. Water may be sprayed onto the clinker in the chute, F, by a spraying device, I, supplied through a pipe, I'. This serves to further cool the clinker in the chute and hydrogen gas from the decomposition of the steam in the kiln is produced which serves to further enrich the combustible gases formed or set free in the kiln. Any suitable kind of fuel may be employed,—either in a powdered, gaseous, or liquid form. I prefer to use powdered fuel, which it may be assumed is stored in a box or hopper, J, and passes therefrom through a pipe, J', having a regulating valve, $j$.

As shown in Fig. 2, the pipe, J', is provided with a branch pipe, J², communicating with a three-way coupling, J³, provided with a nozzle, J⁴, extending toward the kiln. Heated air from the clinker cooler passes out at the top through a pipe, K, and down through a fan, L, to a pipe, $l$, connected with a nozzle, L', provided with a valve $k$ and extending into the three-way coupling, J³, and serving to inject the fuel into the furnace. The pipe, K, is preferably provided with a valved branch pipe, K', by means of which atmospheric or unheated air may, if desired, be admitted. A further supply of air may be obtained by causing the nozzle, J⁴, to pass through a cone, M, secured to the hood, F', and provided at its rear or larger end with a rotary damper or valve, M', of well known construction, by adjusting which the amount of air admitted may be regulated. It will be observed that the nozzle, J⁴, extends through an elongated opening, $m$, in the rear end of the cone, and the pipe connections above described are such that the fuel, and consequently the flame, may be caused to pass into the kiln in line with or parallel with the axis thereof, or it may be inclined toward the bottom so as to impinge against the cement-forming material.

I so regulate the admission of fuel and air as to produce incomplete combustion in the kiln, A, in order that gases rich in carbon monoxid may be delivered by the rotary kiln. The proportions of air and fuel supplied to the kiln should be such as to produce partial combustion in order to obtain the heat necessary to produce the clinker; but at the same time, I supply such an excess of fuel, or such a deficiency of air as to also obtain stack gases rich in carbon monoxid. In the apparatus shown in Fig. 1, as soon as the gases leave the kiln they enter the chamber, B, and are mixed with air admitted in regulated quantities through the ports $b^4$, $b^5$, being burned here, they pass directly into the drier, C, dry the material therein, and then pass out through the chamber, D and stack, D'. The dried material falls into the chamber, B, and piles up therein as indicated. It may be withdrawn from time to time through the door, $b^2$. Preferably some of the air passes up through the dried material before mixing with the carbon monoxid so as to cool to some extent the dried material and to itself become heated, while additional air may be supplied above the pile, as indicated. Any solid material coming over with the gases is caused to fall to the bottom of the chamber, B, and commingle with the dry material received from the drier, C, by means of the deflectors, N, and this material can thus be saved and returned to the kiln after being pulverized.

Preferably I provide a small fire, O, which may be in a compartment opened and closed by a door, $o$. This is for the purpose of initially igniting the gases in the chamber, B. This fire may be a very small one and it may be only used for a short time, or it may be maintained for an indefinite time or only used when necessary. It is obvious that while the sensible heat from the rotary kiln is very great and may be used for drying purposes, it is not near so great as the heat produced by combining with the sensible heat from the rotary kiln the heat produced by the combustion of the carbon monoxid gases in the manner above specified.

In Figs. 3 and 4 of the drawings I have shown a modified form of apparatus. In this case the rotary kiln delivers into a chamber, B, similar in some respects to the chamber, B, in Fig. 1, but instead of having the air ports, $b^4$, $b^5$, air is admitted at $p$ to air heating pipes, P within the chamber. The air traverses the sinuous course indicated and leaves the heater at $p'$. A door, $p^2$, is preferably provided in the bottom of the mixing chamber through which dust or other solid matter may be removed and the air inlet, $p$, is provided with a valve, $p^3$, to regulate the amount of air admitted. Preferably, as shown in Fig. 4, the chamber, B, communicates with a conduit, Q, leading to a fan, Q', which communicates with a stack, $Q^2$. At the point, R, is arranged a fire-place similar to that indicated at O in Fig. 1, and for a similar purpose, i. e., to initially ignite the gases in or issuing from the mixing chamber. It will be understood that the carbon monoxid gases issuing from the rotary kiln are mixed with the proper proportions of air and are ignited producing intense heat supplementing the intense sensible heat of the incombustible gases. The heat thus derived may be used for many purposes. As indicated in Figs. 3 and 4, it is employed for heating regenerators, S, S', $S^2$, $S^3$. This arrangement is especially useful where producer gas is employed in the rotary kiln.

In Fig. 4, T, indicates a gas producer which is connected by a pipe, $t$, and branch pipes, $t'$, $t^2$, with the regenerators, S, $S^3$. Suitable valves are shown for regulating the passage of gas through these regenerators, and it will be understood that the producer gas passes through only one regenerator at a time. The heated producer gas passes by pipes, $t^3$, $t^4$, to the injecting apparatus, $T^3$. Air is supplied to the injecting apparatus through a pipe, $T^4$, communicating by branch pipes, $t^5$, with the regenerators S', $S^2$, and pipes, $t^6$, $t^7$, communicating with the injecting apparatus, $T^3$. The conduit, Q, has separate communications, $q$, $q'$, $q^2$, $q^3$, with the regenerators and these communications have suitable valves as indicated. The heated gases may be caused to pass from the conduit, Q, through any of the regenerators. Preferably the regenerators are worked in pairs, that is to say, one regenerator is used to heat gas and another air, while the other two regenerators are being heated by the gases from the conduit, Q. After these last mentioned regenerators are heated sufficiently and the other two regenerators have been cooled down, the arrangement of the regenerators is shifted so as to pass the producer gas and air through the heated regenerators, and so on. Of course, if powdered fuel is employed, two of the regenerators may be omitted and the others may be used for heating the air.

What has just been described is merely for illustrating one of the many ways in which the hot gases from the mixing chamber may be employed to heat various forms of apparatus. It will be understood that in the apparatus illustrated the injector, $T^3$ feeds a second kiln, A. The hot gases might be employed to heat regenerators for a series of kilns.

In Fig. 5, I have shown how the hot gases may be employed to heat a steam boiler. In this figure of the drawings I have shown a slight modification in the manner of handling the clinker. Instead of elevating it by a bucket conveyer to a clinker cooler, it is shown as being carried off by a conveyer, $F^4$. The chamber, B, and its appurtenances are substantially the same as those shown in Fig. 3, and the initial igniting device, R, is the same. The hot gases pass into a boiler-setting, U, up around the tubes, U', over a partition $U^2$, then down around the tubes and through a conduit, $U^3$, to a fan, $U^4$, and thence to a stack, $U^5$. This stack may be provided at the top with a damper, $u$, and at the bottom with another damper, $u'$, to regulate the draft through the stack. I have shown a familiar form of boiler, but the special construction of the boiler and its appurtenances is not of great importance except that the tubes should be exceptionally wide apart to permit free passage of gas.

I may supplement the heat of the gases from the kiln by an ordinary furnace, or such a furnace can be provided for the purpose of keeping up steam when the rotary kiln is not in operation. In Figs. 6 and 7 I have shown an apparatus for this purpose.

As indicated in Fig. 7, the gases from the rotary kiln pass to a chamber, B, and then to a pipe or conduit, V, which has a valved branch pipe, V', leading to the stack, W. A valve, $v$, is also provided in the main pipe, V. If this valve is closed and the valve in the branch pipe, V' is open, the gases from the kiln may be allowed to pass directly to the stack. If, however, the valve, $v'$, is closed and the valve, $v$, is opened, the hot gases can pass to the boiler, U, which is the same in construction and arrangement as that shown in Fig. 5.

In Fig. 6, I have shown a furnace, X, of ordinary construction which communicates with the interior of the boiler setting. The products of combustion may pass up and over the partition, $U^2$, and commingle with the hot gases from the kiln, or the gases passing from the furnace, X, over the partition may be used alone when required to keep up steam. I may also use in connection with the apparatus described, a feed water heater, Y. This is arranged in a chamber, Y', communicating with the boiler, U. The water may be admitted at $y$, pass through the feed water heater, Y, and then pass by the pipe $y'$, to the boiler. The chamber, Y, communicates by means of a passage, Z, with a fan, Z', which communicates with the stack, W.

I have shown several forms of apparatus in which my invention may be embodied. I would say, however, that the rotary kiln referred to may be of any approved construction and may be operated to clinker Portland cement, to burn lime, to roast ores, or for drying and calcining lime stone, shale, clay or rock, or for any other purposes for which a rotary kiln or its equivalent is suitable.

The fuel used in the kiln may be coal, oil, gas, or other suitable fuel. One or more rotary kilns may be used in connection with one or more driers, boilers or other apparatus, or one or more rotary kilns may be used in connection with a single drier, boiler, or other apparatus. The apparatus to be heated can be located in line with the rotary kiln, or it may be otherwise arranged. While I preferably use a rotary drier, when a drier of any kind is employed, other forms of driers may be used, and any suitable temperature may be maintained therein to dry shale, clay, lime stone, rock, ore, or other material, or if the apparatus is operated to obtain a sufficiently high temperature, I may employ the hot gases to calcine various materials. It will thus be seen that one of the principal objects of my invention is to increase or add to the sensible heat ordinarily obtained from a rotary kiln, and to use the hot gases thus brought to a high temperature to heat other apparatus, the process being so conducted that while there may be some loss in the rotary kiln, this loss is compensated by subsequent combustion of the combustible gases in other adjacent apparatus. The economy of my method will be appreciated when it is remembered that in the ordinary method of operating rotary kilns from 35% to 50%, or even more of the fuel used is lost by what goes to waste up the stacks.

I preferably, as illustrated in the drawing, mix air with the carbon monoxid soon after it leaves the rotary kiln, but this air may be admitted at any suitable point.

The carbon monoxid thus produced in increased quantities in the rotary kiln may not be immediately mixed with air, it may be conveyed to a gas engine, if desired, and used there in the usual way, in which case the means shown for spraying water on the clinker and carrying the steam to be converted into hydrogen gas into the kiln, and the devices for mixing air with the gases issuing from the kiln, will, of course, be omitted, and the carbon monoxid would be taken by a suitable receiver placed near the exit end of the kiln.

In Fig. 8 I have shown how my improvements may be combined with a gas producer where the gases issuing from the kiln may be further enriched by changing their carbon dioxid into carbon monoxid. As shown the kiln, A, delivers to a chamber, B, which is similar in some respects to those shown in Figs. 1 and 5, but no means is provided for admitting air to this chamber. Dust is, however, deposited in the chamber by means of baffle plates, N. The gases pass through a valved pipe, $N'$, to a fan, $N^2$, and thence through a pipe, $N^3$, to the producer, $N^4$, which may be of any approved construction. Air may be admitted at $N^5$ or at any suitable point to the producer. From the producer the gases may pass to a gas scrubber, $N^6$, of any suitable construction, and may thence pass to a gas engine, $N^7$. The gases from the producer may, however, be conveyed elsewhere and used for other purposes.

Again referring to the general principles involved in my invention, and especially to that part of my invention which relates to the manufacture of cement and in the utilization of gases issuing from a rotary kiln, the method of operation and the economy resulting therefrom may be illustrated by a comparison of the old method of operation with that of my present invention.

Assuming that a cement plant uses in its rotary kilns 120 lbs. of coal per barrel of cement and has its stack gases of such temperature that the heat wasted up the stack represents 40% of this fuel consumption, (which is a conservative and usual proportion with a 60 foot kiln) and consider that the same plant uses 65 lbs. of coal under the boilers per barrel of cement for developing power, and for the purpose of this theoretical calculation, consider the calorific power of the fuel to be the same as that of carbon, 1 lb. burning to $CO_2$ developing 14,650 British thermal units, and 1 lb. burning to CO developing 4,485 British thermal units; the CO burning to $CO_2$ then further developing 10,165 British thermal units which figures, while not absolutely accurate, are sufficiently close for the purposes of the calculation. The amount of heat developed in the kiln per barrel of cement by the ordinary perfect combustion of the fuel is $120 \times 14,650 = 1,758,000$ British thermal units, of which 703,200 British thermal units escapes up the stack and about 440,000 British thermal units is required to expel the $CO_2$ and moisture from the charge of the kiln and about 190,000 British thermal units is carried out with the clinker, the remainder of the heat being lost by radiation, etc. The perfect combustion of the 65 lbs. per barrel of cement under the boilers develops 952,250 British thermal units.

Consider now that the same kiln is operated according to my process as herein described and that 140 lbs. of coal per barrel of cement are burned in the rotary kiln instead of the 120 lbs. as before, and that the amount of air admitted is so regulated that about 110 lbs. of the fuel is burned perfectly to $CO_2$ and about 30 lbs. is burned incompletely to CO. Consider further that the waste gases, both by their sensible heat and the heat developed by the combusion of their CO, are used to heat boilers. The amount of heat thus obtained and applied would then be represented by the following statement:—110 lbs. coal burning to $CO_2$ develops $110 \times 14,650 = 1,611,500$ B. T. U. 30 lbs. coal burning to CO develops $30 \times 4,485 = 134,550$ B. T. U. A total heat of 1,746,050 B. T. U. an amount approximately the same as before, thus permitting the operation of the clinkering, etc. in the rotary kiln to continue about as usual. The 40% of the heat escaping to the stack would then represent 698,420 British thermal units and completing the combustion of the 30 lbs. coal which originally were only burned to CO would develop $30 \times 10,165 = 304,950$ British thermal units, this added to the 698,420 British thermal units makes a total of 1,003,370 British thermal units available for heating the boilers, being an amount considerably in excess of the 952,250 British thermal units required ordinarily at the plant in question. The economy in this case consists then in performing with the 140 lbs. of coal per barrel of cement used in a rotary kiln operated in accordance with my invention, the same effect which would require in the ordinary practice $120 \times 65 = 185$ lbs. of coal per barrel of cement. A saving in the case named, by way of illustration, of nearly 25% of the total fuel consumption for calcining and for power.

I claim as my invention:—

1. The herein described process of drying or calcining calcareous, mineral, or similar material, which consists in feeding fuel and air to a rotary kiln, to which such material is supplied, in such proportions as to develop in the kiln, by the complete combustion of part of the fuel and the partial combustion of the remainder, a heat sufficient to dry, to calcine or to clinker the material, and also by the deficiency of air supplied or the excess of fuel to produce stack gases rich in carbon monoxid suitable when mixed with air to be burned for heating or operating other apparatus.

2. The herein described process of calcining or clinkering cement-forming material which consists in feeding fuel and air to a rotary kiln in such proportions as to develop in the kiln by the complete combustion of part of the fuel and the partial combustion of the remainder, a heat sufficient to calcine or to clinker the cement-forming material fed to the kiln and also by the deficiency of air supplied or the excess of fuel to produce stack gases rich in carbon monoxid suitable when mixed with air to be burned for heating or operating other apparatus.

3. The herein described process of calcining or clinkering cement-forming material which consists in feeding fuel and air to a rotary kiln, to which such material is supplied, in such proportions as to develop in the kiln by the complete combustion of part of the fuel and the partial combustion of the remainder, a heat sufficient to calcine or to clinker such material and also by the deficiency of air supplied or the excess of fuel to produce stack gases rich in carbon monoxid suitable when mixed with air to be burned for heating or operating other apparatus, and in causing the flame of the burning fuel within the kiln to impinge on the cement-forming material to clinker it.

4. The herein described process of drying or calcining calcareous, mineral, or similar material which consists in feeding fuel and air to a rotary kiln, to which such material is supplied, in such proportions as to develop in the kiln by the complete combustion of part of the fuel and the partial combustion of the remainder, a heat sufficient to dry, to calcine or to clinker such material and also by the deficiency of air supplied or the excess of fuel to produce stack gases rich in carbon monoxid and then further enriching such stack gases by passing them through a gas producer.

In testimony whereof, I have hereunto subscribed my name.

BERNARD ENRIGHT.

Witnesses:
HENRY A. BECKERS,
ANNA BECKERS.